United States Patent [19]

Nachtkamp et al.

[11] Patent Number: 5,141,987
[45] Date of Patent: Aug. 25, 1992

[54] AQUEOUS COATING COMPOSITIONS CONTAINING WATER DISPERSIBLE POLYURETHANE POLYUREAS AS BINDERS AND THE COATINGS PRODUCED THEREFROM

[75] Inventors: Klaus Nachtkamp, Düsseldorf; Jürgen Mosbach, Bergisch-Gladbach; Klaus Noll, Koeln; Hans G. Schmitz, Moers; Armin Sickert, Krefeld, all of Fed. Rep. of Germany

[73] Assignee: Bayer Aktiengesellschaft, Leverkusen, Fed. Rep. of Germany

[21] Appl. No.: 604,718

[22] Filed: Oct. 26, 1990

[30] Foreign Application Priority Data

Nov. 4, 1989 [DE] Fed. Rep. of Germany ....... 3936794

[51] Int. Cl.$^5$ .......................... C08J 3/00; C08K 3/20; C08L 75/00; C08G 18/30
[52] U.S. Cl. .................... 524/591; 524/839; 528/76; 528/79; 528/80
[58] Field of Search .................. 524/591, 839; 528/76, 528/79, 80

[56] References Cited

U.S. PATENT DOCUMENTS

| | | | |
|---|---|---|---|
| 4,240,942 | 12/1980 | Wenzel et al. | 260/29.2 |
| 4,558,090 | 12/1985 | Drexler et al. | 524/591 |
| 4,594,385 | 6/1986 | Thoma et al. | 524/839 |
| 4,652,466 | 3/1987 | Thoma et al. | 427/244 |
| 4,719,132 | 1/1988 | Porter, Jr. | 427/409 |
| 4,851,460 | 7/1989 | Stranghoner et al. | 523/407 |
| 4,880,867 | 11/1989 | Gobel et al. | 524/507 |

FOREIGN PATENT DOCUMENTS 1348006  3/1974  United Kingdom .

*Primary Examiner*—Paul R. Michl
*Assistant Examiner*—Patrick Niland
*Attorney, Agent, or Firm*—Joseph C. Gil; Thomas W. Roy

[57] ABSTRACT

This invention relates to an aqueous coating composition containing aluminum pigments and a water dispersible polyurethane polyurea binder which contains
(i) at least 200 milliequivalents per 100 g of solids of chemically incorporated carbonate groups —O—CO—O— and
(ii) a combined total of up to 320 milliequivalents per 100 g of solids of chemically incorporated urethane groups —NH—CO—O— and chemically incorporated urea groups —NH—CO—NH—.

The invention further relates to coatings prepared from the aqueous coating composition.

5 Claims, No Drawings

AQUEOUS COATING COMPOSITIONS CONTAINING WATER DISPERSIBLE POLYURETHANE POLYUREAS AS BINDERS AND THE COATINGS PRODUCED THEREFROM

BACKGROUND OF THE INVENTION

1. Field of the Invention

The present invention relates to new aqueous coating compositions for the production of metallic base lacquers wherein the binder is based on polyurethane polyureas containing a minimum amount of carbonate groups and a maximum amount of urethane and urea groups, and to the coatings produced from these coating compositions.

2. Description of the Prior Art

The coating of motor vehicles with so-called metallic coatings has in recent years increasingly replaced coating in plain colors. The classical one layer coating has therefore progressively given way to the formation of an intermediate build up of layers of metal pigmented base coats and clear top coats.

These base coats must be highly diluted and, therefore, make a relatively very large contribution to the total solvent emission from a coating line. There has therefore been a trend to use base coats in which the binders are soluble or dispersible in water. Such binder solutions or dispersions must be suitable for use in preparing:

the first (original) coating applied by the manufacturer in which the coating composition is used in stoving systems, and a repair coating which is applied to the vehicle after its manufacture and is therefore limited to the temperatures obtained during forced drying (i.e., $\leq 90°$ C.).

The use of aqueous binders as metallic base coats is known. For example, DE-OS 3,210,051 describes metallic base coats in which the binders are based on water dispersible polyurethane polyureas which can be cross-linked with melamine formaldehyde resins or blocked polyisocyanates with the aid of heat after the base coat has been applied. EP-A-256,540 discloses aqueous mixtures of polymers containing hydroxyl groups and hydrophilic polyurethane polyureas which are substantially identical to those just described and may also be cross-linked by this method.

According to EP-A-260,447, polycondensates are used as mixtures with conventional polyurethane dispersions. The polycondensates contain carboxyl and epoxy groups, are self cross-linking and therefore do not require the addition of melamine resins.

Similar to EP-A-256,540, binders for metallic multilayered coatings based on mixtures of hydroxyl-containing polymers and hydrophilic polyurethane polyureas are described in EP-A-297,576; however, the polymers for these binders are prepared by emulsion polymerization of their monomers in the aqueous polyurethane polyurea dispersion used as carrier medium.

Polyurethane dispersions in which the dispersed phase is based on cross-linked polyurethanes are described in DE-OS 3,545,618 and in DE-OS 3,606,513. In the former, cross-linking is occurs before dispersion in water, while in the latter the polyurethane is crosslinked by heating after conversion into an aqueous dispersion.

Common to all of these known polyurethanes and polyurethane polyureas is the fact that the macrodiols used for their preparation are polyether polyols or preferably polyester diols and, in particular, polylactone diols. The drying and cross-linking temperatures mentioned in the prior publications generally range from about 80° C. to 140° C., which satisfies the condition mentioned above that the binders must be suitable for two different uses, i.e., as stoving lacquer binders used for the original coating in the manufacture of the car body (stoving temperatures above 140° C.) and as binders for repair lacquers which may be used, for example, for recoating individual faulty patches on the already assembled vehicle and which are cured at about 80° C. It must be possible to use the same lacquer formulation for the repair coating as that used for the stoving lacquer, both for economic reasons and to ensure absolute identity of color and surface effect. It is also essential that the most important coatings, e.g., adhesion and weather resistance, must also be obtained in the repair coatings.

One particularly important property is the resistance of the coating to condensation water. This property is determined according to DIN 50,017 by exposing a coated test sample to condensing water vapor at about 40° C. in an air conditioning chamber. After a predetermined length of time, the test sample is examined for the formation of blisters which are an indication of the loss of adhesion between the coating and the substrate due to moisture penetrating the lacquer film. The brilliance (or "distinctness of image" (DOI)) is also determined by this test and should not undergo any significant deterioration. Lacquer films which have been cured at low temperatures in the drying process have particular difficulty passing this test, especially if they have been formed from aqueous dispersions. Thus polyurethanes from the aqueous phase which are commercially available generally only moderately pass this test and in some cases fail completely.

Another essential requirement for the repair coating is when the metallic base coat is cured at low temperature, it must adhere firmly to the previously stoved top coat lacquer. The reason for this is that if any areas of coated surface on a finished part are damaged during assembly, the faulty patches are generally rubbed down only over a small area with a suitable abrasive. This either completely removes the top coat of lacquer or roughens it up sufficiently to enable the fresh layer of lacquer to adhere firmly. However, in order to ensure optical continuity the repairing base coat is sprayed over a wide area on and adjacent to the faulty patch and therefore over a considerable area of top coat lacquer which has not been rubbed down. The repair coating must adhere just as firmly to this area as to the original surface layer. The adhesion is determined in practice by the grid section method (according to s DIN 151). The known polyurethane coatings do not satisfy the above requirement satisfactorily, if at all.

It is an object of the present invention to provide new aqueous coating compositions for the production of metallic base coats which satisfy the previously mentioned property requirements, i.e., (1) coatings of the same quality are obtained regardless of the curing temperature so that the coating compositions are suitable for both stoving lacquers for the unfinished shell of motor vehicles and as repair lacquers and (2) coatings obtained from the compositions possess good resistance to condensation water and good adhesion regardless of their method of application.

It was surprisingly found that this object could be achieved with the coating compositions according to the present invention. The polyurethane polyureas present as binders or binder components in the coating compositions according to the invention have a minimum carbonate group content and a maximum urethane and urea group content which surprisingly results in the in the desired property improvements.

SUMMARY OF THE INVENTION

This invention relates to an aqueous coating composition containing aluminum pigments and a water dispersible polyurethane polyurea binder which contains
(i) at least 200 milliequivalents per 100 g of solids of chemically incorporated carbonate groups —O—CO—O— and
(ii) a combined total of up to 320 milliequivalents per 100 g of solids of chemically incorporated urethane groups —NH—CO—O— and chemically incorporated urea groups —NH—CO—NH—.

The invention further relates to coatings prepared from the aqueous coating composition.

DETAILED DESCRIPTION OF THE INVENTION

The polyurethane polyureas essential to this invention may be prepared in known manner by reacting
a) organic polyisocyanates which contain no hydrophilic groups or groups convertible into hydrophilic groups with
b) relatively high molecular weight organic polyhydroxyl compounds which have no hydrophilic groups or groups convertible into hydrophilic groups,
c) optionally low molecular weight compositions containing at least two isocyanate reactive groups but no hydrophilic groups or groups capable of conversion into hydrophilic groups,
d) optionally non-ionic hydrophilic starting components containing at least one isocyanate group or at least one isocyanate reactive group and
e) Optionally starting components containing at least one ionic group or at least one group capable of conversion into an ionic group as well as at least one isocyanate reactive hydrogen atom,
provided that the quantities of non-ionic groups and ionic groups present in components d) and e) are sufficient to ensure the dispersibility of the polyurethane polyureas in water.

The reaction between isocyanate groups and hydroxyl groups results in urethane groups, while any urea groups present in the reaction products are formed from aminic starting components and/or the reaction between isocyanate groups and the dispersing water which is always possible during the preparation of the aqueous polyurethane dispersions. It is essential to this invention that the nature and quantitative proportions of the starting materials are chosen such that the resulting polyurethane polyureas contain at least 200 milliequivalents, preferably at least 250 milliequivalents, per 100 of solids content, of chemically incorporated carbonate groups —O—CO—O—, and a combined total of up to 320 milliequivalents, preferably 200 to 300 milliequivalents and more preferably 200 to 300 milliequivalents, per 100 g of solids content, of urethane groups —NH—CO—O— and urea groups —NH—CO—NH—.

The polyisocyanate component a) used for the process according to the invention includes any polyisocyanates known from polyurethane chemistry. These polyisocyanates generally have a molecular weight of 112 to 1000, preferably 140 to 400. Suitable polyisocyanates are those which correspond to the formula Q(NCO)$_n$ wherein Q represents an organic group obtained by removing the isocyanate groups from an organic polyisocyanate having a molecular weight of 112 to 1000, preferably 140 to 400, and n stands for a number from 2 to 4, preferably 2 or 3 and more preferably 2. In the above formula Q preferably represents a divalent aliphatic hydrocarbon group having 4 to 18 carbon atoms, a divalent cycloaliphatic hydrocarbon group having 5 to 15 carbon atoms, a divalent aromatic hydrocarbon group having 6 to 15 carbon atoms or an araliphatic hydrocarbon group having 7 to 15 carbon atoms. Examples of suitable polyisocyanates include tetramethylene diisocyanate, 1,6-diisocyanatohexane (HDI) dodecamethylene diisocyanate, 2,2,4-trimethylhexane diisocyanate, undecane diisocyanate-(1,11), lysine ester diisocyanate, cyclohexane-1,3- and -1,4-diisocyanate, 1-isocyanato-3-isocyanatomethyl-3,5,5-trimethyl cyclohexane (IPDI), 4,4'-diisocyanatodicyclohexylmethane and the compound corresponding to the formula

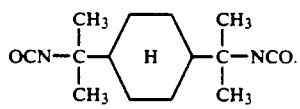

Also suitable are aromatic diisocyanates such as 2,4-diisocyanatotoluene and/or 2,6-diisocyanatotoluene, 4,4''-diisocyanatodiphenyl methane and 1,4-diisocyanatoisopropyl benzene. HDI, IPDI and mixtures of these diisocyanates are particularly preferred.

Component b) includes organic polyhydroxyl compounds having a molecular weight of 300 to 5000, preferably from 500 to 3000, and containing at least 50% by weight, preferably more than 70% by weight, of polyhydroxy polycarbonates. The polyhydroxy polycarbonates are esters of carbonic acid obtained by the reaction of carbonic acid derivatives, e.g. diphenyl carbonate or phosgene, with diols. Examples of these diols include ethylene glycol, propane-1,2- and 1,3-diol, butane-1,4- and -1,3-diol, hexane-1,6-diol, octane-1,8-diol, neopentyl glycol, 1,4-bis-hydroxymethyl cyclohexane, 2-methyl-propane-1,3diol, 2,2,4-trimethylpentane-1,3-diol, diethylene glycol, tri, and tetraethylene glycol, dipropylene glycol, polypropylene glycols, dibutylene glycol, polybutylene glycols, bisphenol A and tetrabromo bisphenol A. The diol component preferably contains from 40 to 100% by weight of a hexane diol, preferably hexane-1,6-diol, and/or hexane diol derivatives preferably containing ether or ester groups in addition to terminal OH groups, e.g. the products obtained by the reaction of 1 mole of hexane diol with $\geq 1$ mole, preferably 1 to 2 moles, of caprolactone according to DE-AS 1,770,245 or the products obtained by the etherification of hexane diol with itself to form dihexylene or trihexylene glycol according to DE-AS 1,570,540. The polyether polycarbonate diols described in DE-OS 3,717,060 are also very suitable.

The hydroxyl polycarbonates should be substantially linear although they may, if desired, be slightly branched by the incorporation of polyfunctional components, in particular low molecular weight polyols such as glycerol, trimethylol propane, hexane-1,2,6-triol, butane-1,2,4-triol, trimethylol propane, pentaerythritol, quinitol, mannitol and sorbitol, methyl glycoside and 1,4,3,6-dianhydrohexitols.

In addition to the polyhydroxy polycarbonates, the starting component b) may contain other known polyhydroxyl compounds have the previously described molecular weights, e.g.

1. dihydroxy polyesters obtained from dicarboxylic acids such as succinic acid, adipic acid, suberic acid, azelaic acid, sebacic acid, phthalic acid, isophthalic acid, terephthalic acid, tetrahydrophthalic acid and from diols such as ethylene glycol, propane-1,2-diol, propane-1,3-diol, diethylene glycol, butane-1,4-diol, hexane-1,6-diol, octane-1,8-diol, neopentyl glycol, 2-methyl propane-1,3-diol and the various isomeric bis-hydroxymethyl cyclohexanes;
2. polylactones such as the polymers of ε-caprolactone initiated with the above mentioned dihydric alcohols; and
3. polyethers, e.g., the polymers or copolymers of tetrahydrofuran, styrene oxide, propylene oxide, ethylene oxide, the butylene oxides or epichlorohydrin initiated with divalent starter molecules such as water, the above mentioned diols or amines containing 2 NH bonds, in particular the polymers and copolymers of propylene oxide and optionally ethylene oxide. Ethylene oxide may be used as a portion of the total quantity of ether molecules, provided the resulting polyether diol contains not more than 10% by weight of ethylene oxide units. It is preferred to use polyether diols which have been obtained without the addition of ethylene oxide, especially those based on propylene oxide and tetrahydrofuran alone.

The starting components c) optionally used are known low molecular weight compounds which have a molecular weight below 300, contain hydroxyl and/or amino groups and are at least difunctional in isocyanate addition reactions. Compounds which are difunctional in isocyanate addition reactions (chain lengthening agents) compounds which are at least trifunctional in isocyanate addition reactions (cross-linking agents) and mixtures of such compounds may be used as starting components c). Examples of these compounds include low molecular weight polyhydric alcohols such as ethylene glycol, propane-1,2- and -1,3-diol, butane-1,4- and -1,3-diol, hexane-1,6-diol, octane-1,8-diol, neopentyl glycol, 1,4-bis-hydroxymethyl cyclohexane, 2-methylpropane-1,3-diol, 2,2,4-trimethyl pentane-1,3-diol, glycerol, trimethylol propane, trimethylol ethane, the isomeric hexane triols and pentaerythritol; low molecular weight diamines such as ethylene diamine, 1,2- and 1,3-diaminopropane, 1,3-, 1,4- and 1,6-diaminohexane, 1,3-diamino-2,2-dimethyl propane, isophorone diamine, 4,4′-diaminodicyclohexyl methane, 4,4-diamino-3,3′-dimethyldicyclohexyl methane, 1,4-bis-(2-amino-prop-2-yl)-cyclohexane, hydrazine, hydrazide and mixtures of such diamines and hydrazines; higher functional polyamines such as diethylene triamine, triethylene tetramine, dipropylene triamine and tripropylene tetramine; hydrogenated products of addition of acrylonitrile to aliphatic or cycloaliphatic diamines, preferably those obtained by the addition of an acrylonitrile group to a molecule of a diamine, e.g. hexamethylene propylene triamine, tetramethylene propylene triamine, isophorone propylene triamine or 1,3- or 1,3-cyclohexane propylene triamine and mixtures of such polyamines.

The hydrophilic starting components d) are compositions containing ethylene oxide units incorporated within polyether chains, specifically:

d1) diisocyanates and/or compositions which contain isocyanate reactive hydrogen atoms and are difunctional in isocyanate polyaddition reactions, the diisocyanates and compositions also containing polyether side chains containing ethylene oxide units, and d2) monoisocyanates and/or compositions which are monofunctional in isocyanate polyaddition reactions and contain an isocyanate reactive hydrogen atom, the monoisocyanates and compositions also containing terminal polyether chains containing ethylene oxide units and d3) mixtures of dI) and d2).

Compounds used as starting component dI) are preferably compounds corresponding to formula (I)

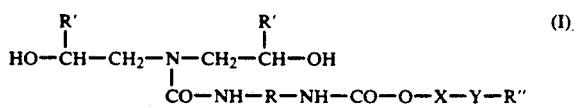

and/or compositions corresponding to formula (II)

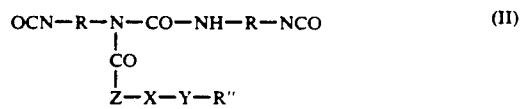

The compounds d2) may in particular be compositions corresponding to formula (III)

compounds corresponding to formula (IV)

and/or compositions corresponding to formula (V)

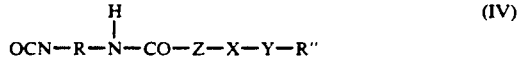

formulas (I) to (V)

R represents a divalent group obtained by removing the isocyanate groups from a diisocyanate corresponding to the formula R(NCO)₂ as previously described (wherein R corresponds to the definition of Q).

R′ represents hydrogen or a monovalent hydrocarbon group having 1 to 8 carbon atoms, preferably hydrogen or a methyl group, R″ represents a monovalent hydrocarbon group having 1 to 12 carbon atoms, preferably an unsubstituted alkyl group having 1 to 4 carbon atoms, X represents a group obtained by removing the terminal oxygen atom from a polyalkylene oxide chain having 5 to 90, preferably 20 to 70 chain members, which chain members contain at least 40%, preferably at least 65%, of ethylene oxide units and may in addition contain propylene oxide, butylene oxide or styrene oxide units, preferably propylene oxide units, Y represents oxygen or NR‴ wherein R‴ has the same definition as R″ and Z represents a group which corresponds to the definition of Y.

The preparation of these hydrophilic starting components (I) to (IV) is carried out by methods analogous to those described in U.S. Pat Nos. 3,920,598, 3,905,929, 4,190,566 and 4,237,264, the disclosures of which are herein incorporated by reference.

The compounds used as starting component e) have at least one isocyanate reactive group and at least one, preferably one ionic group or group convertible into an ionic group (i.e., a o potential ionic group). They include the alcohols containing tertiary amino groups, hydroxy carboxylic acids, hydroxy sulphonic acids, amino carboxylic acids and amino sulphonic acids disclosed in U.S. Pat. No. 3,479,310, herein incorporated by reference. Instead of these starting components containing potential ionic groups, the corresponding salt type derivatives thereof may be used, i.e., ionic groups formed by the quaternization or neutralization of the potential ionic groups. Examples of suitable quaternizing and neutralizing agents for converting the potential ionic groups into ionic groups are also set forth U.S. Pat. No. 3,479,310, which has previously been incorporated by reference. When potential ionic starting components are used, the at least partial conversion of the potential ionic groups into ionic groups is carried out by quaternization or neutralization after or during preparation of the polyurethane polyureas.

Preferred starting components e) include 2,2-bis-(hydroxy-methyl)-alkane monocarboxylic acids having a total of 5 to 8 carbon atoms, i.e., compositions corresponding to the formula:

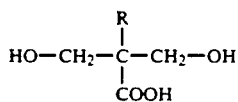

wherein R represents an alkyl group having 1 to 4 carbon atoms, and/or salts thereof obtained by partial or complete neutralization with organic amines or NH3. 2,2-dimethylol propionic acid (2,2-bis-hydroxymethyl propionic acid) and/or salts thereof are particularly preferred for use as starting component e).

Preparation of the polyurethanes from the starting components a) to e) is carried out in known manner in one or more stages using the reactants in such proportions that the equivalent ratio of isocyanate groups present in the starting o components to isocyanate reactive groups present in the starting components is 0.8:1 to 2:1, preferably 0.95:1 to 1.5:1 and more preferably 0.95:1 to 1.2:1.

Component d) is used in a quantity such that the polyurethane polyurea contains 0 to 30% by weight, preferably from 1 to 20% by weight, of ethylene oxide units incorporated in terminal or lateral polyether chains.

The quantity of component e) and the degree of neutralization to form ionic groups are calculated to ensure that the polyurethane finally obtained contains 0 to 120, preferably 1 to 80 milliequivalents, of ionic groups per 100 g of solids. The total quantity of ethylene oxide units and ionic groups must be sufficient to ensure the dispersibility of the polyurethane polyureas in water.

The reaction of the starting components a) to e) may be carried out in one or more stages, optionally in the presence of an isocyanate-inert, water miscible solvent so that the reaction products are obtained in the form of a solution in such a solvent. In this context, the term "solution" denotes either a true solution or a water in oil emulsion which may be formed if, for example, individual starting components are used in the form of aqueous solutions. Examples of suitable solvents include acetone, methylethyl ketone, N-methyl pyrrolidone and any mixtures of such solvents. These solvents are generally used in such quantities that the reaction products of starting components a) to e) are obtained in the form of 10 to 70% by weight solutions.

When the preparation of polyurethane polyureas is carried out as a single stage reaction, the starting components containing isocyanate reactive groups are preferably mixed together and then reacted with the starting components containing isocyanate groups. This reaction is preferably o initially carried out in the absence of solvents at temperatures of 50° to 150° C., optionally in the presence of known catalysts, and the nature and quantitative proportions of the starting components are preferably chosen to provide an equivalent ratio of isocyanate groups to isocyanate reactive groups of from 0.8:1 to 1.05:1.

The viscosity of the mixture increases during the course of the reaction and one of the above mentioned solvents is therefore gradually added to the mixture. The polyurethane content of the organic solution finally obtained is adjusted to a concentration of 10 to 70% by weight, in particular 15 to 55% by weight.

When a two stage process is employed, an isocyanate prepolymer is preferably first prepared solvent free at about 50° to 150° C. from excess quantities of isocyanate-containing starting components and hydroxyl-containing starting components at an NCO/OH equivalent ratio of 1.1:1 to 3.5:1, preferably 1.2:1 to 2.5:1, with or without a solvent, and this isocyanate prepolymer is then taken up in a solvent if no solvent has been used up to this stage. The solution obtained is then further reacted with chain lengthening or cross-linking agents c) which are optionally used in the form of aqueous solutions and are preferably starting components of the above mentioned type containing primary and/or secondary amino groups. The quantity of starting components c) used in the second stage is calculated to ensure that the equivalent ratio of all the starting components used in the first and second stage conforms to the conditions previously stated.

The end products of both variations (single stage or two stage) are solutions of the reaction products in the above mentioned solvent having a solids content within the ranges indicated above.

If any potential ionic groups are present, their at least partial conversion into ionic groups by quaternization or neutralization is advantageously carried out before the addition of the dispersing water. If starting component e) contains carboxyl groups, which is preferred, in particular dimethylol propionic acid, the neutralizing agents used are preferably tertiary amines such as triethylamine, tri-n-butylamine, N,N,N-trimethyl cyclohexylamine, N-methyl morpholine, N-methyl piperazine, N,N-dimethyl ethanolamine, N-methyl piperidine and triethanolamine. For the neutralization of carboxyl groups, it is also preferred to use ammonia under the conditions set forth in EP-A-269 972.

After the addition of water as solvent or dispersing medium, at least the major proportion of the auxiliary solvent used is optionally removed by distillation. The water is used in a quantity which is sufficient to provide a product with a solids content of 10 to 60% by weight, preferably 20 to 45% by weight.

The polyurethane polyureas may also be prepared by other methods known in the art, for example by using hydrazine or diamines as chain lengthening agents c) in a blocked form, i.e., in the form of the corresponding azines or ketimines as disclosed in U.S. Pat. Nos. 4,269,748 and 4,829,122, both of which are herein incorporated by reference.

The so called prepolymer mixing process may also be used (see D. Dieterich, Angew. Makromol. Chem. 9A, 142 (1981)). In this process, an NCO prepolymer is initially prepared as described above and after at least partial conversion of any potential ionic groups present into ionic groups, the prepolymer is mixed with water to form an emulsion. The NCO groups of the prepolymer are then brought to reacted in the aqueous phase by the addition of aminic chain lengthening or cross-linking agents c) and/or by a reaction with water.

In the coating compositions according to the invention, the polyurethane polyureas prepared as described above and dispersed in water are present as binders either on their own or in admixture with other binders. When such mixtures of different binder components are used, the proportion of the polyurethane polyureas according to the present invention is at least 60% by weight, based on the total weight of the binders used. Other binders optionally used in addition to the polyurethane polyureas according to the invention include commercial, aqueous polyacrylate dispersions or solutions, polyester dispersions or solutions and/or water dilutable polyester resins.

The coating compositions according to the invention contain aluminum pigments, which are known, in addition to water, the previously described binders and optionally other color pigments. Further, the coating compositions according to the invention may contain conventional cross-linking agents as well as other auxiliary agents and additives conventionally used in lacquer technology.

Examples of suitable aluminum pigments include preparations (aluminum pastes) of the type available commercially and especially used for aqueous metallic base lacquers, e.g., those marketed under the trade names Alpate WX (Toyo Aluminum K.K.) and Stapa Hydrolac (Eckart-Werke).

Other color pigments may optionally be used and include any inorganic or organic pigments known for the formulation of colored metal effect coating compositions.

The cross-linking agents optionally used include known, partially or completely esterified water miscible melamineformaldehyde condensation products or known blocked polyisocyanates.

These cross-linking resins may be present in the coating compositions in quantities which are sufficient to provide a solids contents of up to 50% by weight, preferably up to 30% by weight, based on the solids content of the binder free from cross-linking agents.

Other auxiliary agents and additives which may optionally be used include, e.g., commercial organic and inorganic thickeners (such as carboxyl group-containing polyacrylates, polyurethanes or special layer silicates), suitable wetting agents and defoamants. These auxiliary agents and additives may be added before or after the process of dispersion.

The coating compositions according to the invention have a solids content of 10 to 40% by weight, preferably 15 to 25% by weight. The dispersed binders according to the invention which are present in the coating compositions are in the form of dispersed particles having average particle diameters of about 10 to 1000 nm, preferably from 30 to 500 nm.

The coating compositions according to the invention are eminently suitable for the formation of metallic base layers in multilayered coatings. The top coats used may be any solvent-containing or aqueous clear lacquers such as commercial two-component polyurethane coating compositions or heat hardenable one-component coating compositions based on polyacrylates and/or polyesters and melamine resins. The coating compositions according to the invention may be used for coating any substrates, e.g., metals, plastics, wood, glass and ceramic materials. The coating compositions according to the invention are particularly suitable for producing metal effect coatings on the materials normally used for the manufacture of car bodies or parts such as plastics or steel sheets optionally previously treated with a primer.

In the following examples, all parts and percentages are based on weight unless otherwise indicated.

EXAMPLES

The following dispersions are used in the examples:

Polyurethane polyurea dispersion A (according to the invention)

A prepolymer containing about 5% of free isocyanate groups was prepared by reacting 850 parts of a polycarbonate of hexane-1,6-diol (prepared by the reaction of hexane-1,6-diol and diphenyl carbonate; hydroxyl number: 56; molecular weight: about 2000), 67.5 parts of a monofunctional polyether alcohol (OH number 26; prepared by the alkoxylation of n-butanol using a mixture of 83% ethylene oxide and 17% propylene oxide), 40.2 parts of 2,2'-bis-hydroxymethyl propionic acid (DMPA) and 23.4 parts of butane-1,4-diol at 100° C. with a mixture of 151.2 parts of 1,6-diisocyanatohexane (HDI) and 199.8 parts of 3-isoyanatomethyl-3,5,5-trimethyl cyclohexyl isocyanate (IPDI). The prepolymer was dissolved in 2440 parts of acetone and the solution was cooled to 50° C.

A solution in 500 parts of water was prepared from 19.8 parts of ethylene diamine and 7.5 parts of hydrazine hydrate. This solution was slowly added to the prepolymer solution with vigorous stirring. A thin, whitish cloudy solution was obtained. 17.8 parts of N,N-dimethyl ethanolamine were added. 1525 parts of deionized water were then added with vigorous stirring and an opaque, bluish white dispersion of the solid substance was obtained. The acetone was removed from this dispersion by distillation under vacuum. A pure, aqueous dispersion having a solids content of 40% was left behind.

The solids content of the dispersion contained (meq% = meq per 100 g of solids):
409 meq% of carbonate groups (—O—CO—O—)
147 meq% of urethane groups (—NH—CO—O—)
94 meq% of urea groups (—NH—CO—NH—)
241 meq% of urethane and urea groups.

Polyurethane polyurea dispersion B (according to the invention)

An aqueous dispersion was obtained from the following materials by the method used to prepare dispersion A:
540 parts of the hydroxyl polycarbonate used to prepare dispersion A
45 parts of the polyether started on n-butanol used to prepare dispersion A
40.2 parts of DMPA 37.8 parts of butane-1,4-diol
151.2 parts of HDI
199.8 parts of IPDI
7.5 parts of hydrazine hydrate
19.8 parts of ethylene diamine
17.8 parts of N,N-dimethyl ethanolamine.

The dispersion contained 35% of solids and had the following composition:
339 meq% of carbonate groups (—O—CO—O—)
192 meq% of urethane groups (—NH—CO—O—)
123 meq% of urea groups (—NH—CO—NH—)
315 meq% of urethane and urea groups.

Polyurethane polyurea dispersion C (according to the invention)

An aqueous dispersion was prepared from the following materials by the method used to prepare dispersion A:
850 parts of the hydroxyl polycarbonate used to prepare dispersion A
67.5 parts of the polyether started on n-butanol used to prepare dispersion A
21.4 parts of DMPA
22.5 parts of butane-1,4-diol
13.4 parts of trimethylol propane
151.2 parts of HDI
199.8 parts of IPDI
7.5 parts of hydrazine hydrate
19.8 parts of ethylene diamine and
13.4 parts of N,N-dimethyl ethanolamine.

The dispersion contained 35% of solid substance which has the following composition:
410 meq% of carbonate groups (—O—CO—O—)
148 meq% of urethane groups (—NH—CO—O—)
95 meq% of urea groups (—NH—CO—NH—)
243 meq% of urethane and urea groups.

Polyurethane polyurea dispersion (according to the invention)

The procedure was the same as that used to prepare dispersion A except that the polycarbonate diol was replaced by a polycarbonate polyester diol having an OH number of 56 and prepared according to DE-AS 1 770 245 by the reaction of diphenyl carbonate with the reaction product of 1 mole of hexane diol and 1 mole of ε-caprolactone. The resulting dispersion had a solids content of 39.5%.

The solid substance contained:
214 meq% of carbonate groups (—O—CO—O—)
147 meq% of urethane groups (—NH—CO—O—)
94 meq% of urea groups (—NH—CO—NH—)
241 meq% of urethane and urea groups.

Polyurethane polyurea dispersion E (according to the invention)

The procedure was the same as for dispersion A except that only 425 g of the polycarbonate diol was used. The remaining 425 parts was based on a polyester diol having an OH number of 56 and prepared from adipic acid and a mixture of hexane diol and neopentyl glycol (molar ratio 65:35). The dispersion obtained has a solids content of 40.5%.

The solid substance contained:
204 meq% of carbonate groups (—O—CO—O—)
147 meq% of urethane groups (—O—CO—NH—)
94 meq% of urea groups (—NH—CO—NH—)
241 meq% of urethane and urea groups.

Polyurethane polyurea dispersion F (comparison example)

An aqueous dispersion was prepared from the following materials by the method used to prepare dispersion A:
380 parts of the hydroxyl polycarbonate used to prepare dispersion A
45 parts of the polymer started on a n-butanol used to prepare dispersion A
53.6 parts of DMPA
184.8 parts of HDI
244.2 parts of IPDI
63 parts of butane-1,4-diol
42 parts of ethylene diamine
5.0 parts of hydrazine hydrate
17.8 parts of N,N-dimethyl ethanolamine.

The dispersion obtained has a solids content of 38.9%.
The solid substance contained:
244 meq% of carbonate groups (—O—CO—O—)
255 meq% of urethane groups (—NH—CO—O—)
167 meq% of urea groups (—NH—CO—NH—)
422 meq% of urethane and urea groups.

Polyurethane polyurea dispersion G (comparison example)

An aqueous dispersion was prepared from the following materials by the method used to prepare dispersion A:
153 parts of a polyester having an OH number of 66 and prepared from adipic acid and a mixture of hexane diol and neopentyl glycol (molar ratio 65:35)
231 parts of a hexane diol polyadipate having an OH number of 134
45 parts of the polyether started on n-butanol used to prepare dispersion A
53.6 parts of DMPA
488.4 parts of IPDI
13.4 parts of TMP
33.8 parts of butane-1,4-diol
42 parts of ethylene diamine
7 parts of hydrazine hydrate
13.8 parts of N,N-dimethyl diethanolamine.

The dispersion had a solids content of 39.6%.
The solid substance was free from carbonate groups and contained:
244 meq% of urethane groups (—NH—CO—O—)
163 meq% of urea groups (—NH—CO—NH—)
407 meq% of urethane and urea groups.

Polyurethane polyurea dispersion H (comparison example)

An aqueous dispersion was prepared from the following materials by the method used to prepare dispersion A:
850 parts of a polyester having an OH number of 56 and prepared from adipic acid and a mixture of hexane diol and neopentyl glycol (molar ratio 65:35)
67.5 parts of the polyether started on n-butanol used to prepare dispersion A
402 parts of DMPA
151.2 parts of HDI
199.8 parts of IPDI
23.4 parts of butane-1,4-diol
19.8 parts of ethylene diamine
7.5 parts of hydrazine hydrate and
17.8 parts of N,N-dimethyl diethanolamine.

The dispersion had a solids content of 40.2%.

The solid substance was free from carbonate groups and contained:
147 meq% of urethane groups (—NH—CO—O—)
94 meq% of urea groups (—NH—CO—NH—)
241 meq% of urethane and urea groups.

Polyurethane polyurea dispersion I (comparison example based on DE-OS 32 10 051)

Using the method of preparation and ingredients set forth for "polyurethane dispersion 1" in DE-OS 32 10 051, a 35% dispersion was prepared. The solid substance was free from carbonate groups and contained:
208 meq% of urethane groups (—NH—Co—O—)
62 meq% of urea groups (—NH—CO—NH—)
270 meq% of urethane and urea groups.

Polyurethane polyurea dispersion K (comparison example based on DE-OS 32 10 051)

Using the method of preparation and ingredients set forth for "polyurethane dispersion 5" in DE-OS 32 10 051 a 19% dispersion was prepared. The solid substance was free from carbonate groups and contained:
63 meq% of urethane groups (—O—CO—NH—)
97 meq% of urea groups (—NH—CO—NH—)
360 meq% of urethane and urea groups.

Dispersion L (according to the invention)

1000 parts of polyurethane polyurea dispersion A (solids content: 40%) were mixed with 460 parts of a commercial aqueous polyacrylate dispersion (Joncryl 538, available from S. C. Johnson & Son Inc.) having a solids content of 45%.

EXAMPLES 1 TO 11

Aqueous metallic base lacquers ready for spraying were prepared from dispersions A to L. The coating compositions were based on the following components:
32.31 parts* of dispersions A to L
42.96 parts* of water
8.77 parts of butyl glycol
3.33 parts of N,N-dimethyl ethanolamine, 10% in water
3.02 parts of thickener (Viscalex HV 30, available from Allied Colloids GmbH, Hamburg)
4.04 parts of cross-linking agent (Cymel 325, 80% as supplied in isobutanol, available from Dyno-Cyanamide, Düsseldorf)
5.57 parts of aluminum paste (Alpate WX 7160, 58%, available from Toyo Aluminium K.K.)

* Applies to dispersions having a solids content of about 40%. For lower solids contents, the quantities of dispersion and water were corrected accordingly so that the coating compositions ready for use have a solids content of 17%.

The preparations ready for spraying have solids contents of about 17% and spraying viscosities of about 30 sec (DIN cup, 4 mm nozzle, 23° C.).

The following coatings were intended to simulate the conditions for repair coating on a coating line of the motor car industry. The coating compositions were applied to zinc phosphatized car body panels which had previously been coated with an electrodeposition primer and filler.

Coating process, type I application of the metallic base coating compositions of Examples 1 to 11 by spraying
3 minutes predrying at 80° C.
application of a conventional, two-component, polyurethane, clear top coat* by spraying
7 minutes exposure to air at RT
45 minutes drying at 80° C.

Coating process, type II application of the metallic base coating compositions of Examples 1 to 11 by spraying, followed by 20 minutes stoving at 140° C.
application of the metallic base coating compositions of Examples 1 to 11 by spraying onto the hardened coatings which had not been sanded down.
3 minutes predrying at 80° C.
application of a conventional, two-component, polyurethane, clear top coat* by spraying
7 minutes exposure to air at RT
45 minutes drying at 80° C.

* The clear top coat is based on a polyacrylate polyol having an OH content of 4.3% (based on the solid resin) and an isocyanurate polyisocyanate based on hexamethylene diisocyanate and having an NCO content of 22% (based on the solid resin). The NCO/OH equivalent ratio was 1.0.

The properties of the individual lacquers are set forth in the following table:

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Dispersion used | A | B | C | D | E | F | G | H | I | K | L |
| Coating process, type 1 | | | | | | | | | | | |
| ME Value (flop)[1] | 357 | 295 | 331 | 312 | 290 | 394 | 336 | 214 | 286 | 295 | 220 |
| Brilliance (D.O.I.)[2] | 70 | 70 | 70 | 70 | 70 | 70 | 70 | 70 | 70 | 70 | 70 |
| Resistance to water of condensation[3] | | | | | | | | | | | |
| Brilliance (D.O.I.)[2] | 70 | 65 | 70 | 70 | 65 | 40 | 10 | 60 | 60 | 40 | 65 |
| Assessment of film | ←nothing abnormal→ | | | | | ←wrinkled→ | | | | | nothing abnormal |
| Coating process, type II adherence[4] | Gt 0 | Gt 0 | Gt 0 | Gt 0 | Gt 0 | Gt 5 | Gt 5 | Gt 3 | Gt 4 | Gt 5 | Gt 0 |

[1] Metallic effect value, determined with a Gonio Photometer GP 3 of Zeiss
[2] Distinction of image (100 = highly brilliant, 0 = completely mat)
[3] After 240 hours test in Atmosphere according to DIN 50,017
[4] Grid section test according to DIN 53,151 (Gt 0-5)

Although the invention has been described in detail in the foregoing for the purpose of illustration, it is to be understood that such detail is solely for that purpose and that variations can be made therein by those skilled in the art s without departing from the spirit and scope of the invention except as it may be limited by the claims.

What is claimed is:

1. An aqueous coating composition comprising an aluminum pigment and a water dispersible polyurethane polyurea binder which contains (i) at least 200 milliequivalents of chemically incorporated carbonate groups, —O—CO—O—, per 100 g of solids and (ii) a combined total of up to 320 milliequivalents, per 100 g of solids, of chemically incorporated urethane groups, —NH—CO—O—, and chemically incorporated urea groups, —NH—CO—NH—.

2. The aqueous coating composition of claim 1 wherein the binder additionally contains a positive amount of up to 40%, based on the total weight of the binder, of at least one other water dispersible polymer.

3. The aqueous coating composition of claim 1 wherein said water dispersible polyurethane polyurea binder contains a combined total of 200 to 320 milliequivalents, per 100 g of solids, of chemically incorporated urethane groups, —NH—CO—O—, and chemically incorporated urea groups, —NH—CO—NH—.

4. The aqueous coating composition of claim 2 wherein said water dispersible polyurethane polyurea binder contains a combined total of 200 to 320 milliequivalents, per 100 g of solids, of chemically incorporated urethane groups, —NH—CO—O—, and chemically incorporated urea groups, —NH—CO—NH—.

5. A coating prepared from the aqueous coating composition of claim 1.

* * * * *